(12) United States Patent
Chin et al.

(10) Patent No.: US 12,332,632 B2
(45) Date of Patent: Jun. 17, 2025

(54) METHOD TO SUPPORT AUTONOMOUS ROBOT-TO-ROBOT IDENTIFICATION AND TASK TRANSFER

(71) Applicant: Intel Corporation, Santa Clara, CA (US)

(72) Inventors: Siew Wen Chin, Penang (MY); Sangeeta Manepalli, Chandler, AZ (US); John Belstner, Scottsdale, AZ (US); Atul N. Hatalkar, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 847 days.

(21) Appl. No.: 17/357,016

(22) Filed: Jun. 24, 2021

(65) Prior Publication Data
US 2022/0107625 A1 Apr. 7, 2022

(51) Int. Cl.
*G05B 19/41* (2006.01)
*B25J 9/00* (2006.01)
(Continued)

(52) U.S. Cl.
CPC ........ *G05B 19/4155* (2013.01); *B25J 9/0084* (2013.01); *B25J 9/1661* (2013.01); *G06F 21/445* (2013.01); *G05B 2219/40419* (2013.01)

(58) Field of Classification Search
CPC ...... G05B 19/4155; G05B 2219/40419; G05B 2219/33105; G05B 2219/40068;
(Continued)

(56) References Cited

U.S. PATENT DOCUMENTS

| 6,035,188 A | 3/2000 | Hoogerwerf et al. |
| 2017/0132477 A1* | 5/2017 | Kim ................. G08G 1/096716 |

(Continued)

FOREIGN PATENT DOCUMENTS

| DE | 102022106153 A1 | 12/2022 | |
| WO | WO-2022199856 A1 * | 9/2022 | .............. B25J 9/161 |

OTHER PUBLICATIONS

Sklar, Julia, "Making Robots Talk to Each Other", [Online]. Retrieved from the Internet: URL: https: www.technologyreview.com 2015 08 04 10940 making-robots-talk-to-each-other , (Aug. 4, 2015), 7 pgs.

*Primary Examiner* — Adam R Mott
*Assistant Examiner* — Sagar Kc
(74) *Attorney, Agent, or Firm* — Schwegman Lundberg & Woessner, P.A.

(57) ABSTRACT

Described herein is a technique that provides a first robot associated with a first trust domain to identify and authenticate a second robot associated with a second trust domain. The identification and authentication technique described herein is based on a robot processing a variety of input signals obtained via sensors, in order to generate robot identification information that can be compared with known or trusted information. Advantageously, the identification technique occurs locally, for example, at the robot and at the location of the robot-to-robot interaction, eliminating any requirement for communicating with an authoritative remote or cloud-based service, at the time and place of the robot-to-robot interaction.

21 Claims, 5 Drawing Sheets

(51) Int. Cl.
*B25J 9/16* (2006.01)
*G05B 19/4155* (2006.01)
*G06F 21/44* (2013.01)

(58) Field of Classification Search
CPC ........ B25J 9/0084; B25J 9/1661; B25J 5/007;
B25J 13/003; B25J 9/1679; B25J 19/021;
G06F 21/445; G06F 2221/2111; G06F
21/44
See application file for complete search history.

(56) References Cited

U.S. PATENT DOCUMENTS

2017/0201378 A1* 7/2017 Kim .................. G06F 21/73
2018/0043547 A1* 2/2018 Hance ................ B25J 19/021
2018/0102906 A1* 4/2018 Lindberg ............ H04L 63/0853
2019/0311111 A1* 10/2019 Lee .................... G06T 7/11
2019/0334723 A1* 10/2019 Endress ............... H04L 9/3236
2019/0381664 A1* 12/2019 Whitman ............. B25J 9/1694

* cited by examiner

METHOD TO SUPPORT AUTONOMOUS ROBOT-TO-ROBOT IDENTIFICATION AND TASK TRANSFER

TECHNICAL FIELD

The present application generally relates to techniques for providing robots, associated with separate trust domains, capabilities to identify and authenticate one another for purposes of establishing trust in connection with the delivery and exchange of an asset (e.g., a physical package or digital information) from one robot to another.

BACKGROUND

As a variety of technologies relating to robotics continue to mature, a wider variety of tasks are being automated and the number of service robot deployments is increasing. Among the many tasks that are being automated, certain tasks, such as parcel delivery, require these autonomous mobile robots (AMR) to cross certain security boundaries. For instance, just as humans are "cleared" to be in certain secure areas (e.g., rooms, facilities, or compounds), certain service robots need to be cleared to be present in these secure areas. As such, there exists a need for robot identity management to "recognize" robots that are cleared along with a mechanism for secure handover of a physical parcel or digital information from an unsecured public robot to a trusted private robot.

BRIEF DESCRIPTION OF THE DRAWINGS

Embodiments of the present invention are illustrated by way of example and not limitation in the figures of the accompanying drawings, in which.

DETAILED DESCRIPTION

Described herein are methods and systems for providing two or more robots, operating in and/or associated with separate trust domains, capabilities to identify and authenticate one another for purposes of establishing trust in connection with the delivery and exchange of an asset (e.g., a physical package or digital information) from one robot to another. It will be evident, however, to one skilled in the art, that embodiments of the various apparatuses, methods and systems described herein may be practiced and/or implemented with varying combinations of the many details and features described herein.

As a wide variety of tasks are being automated through the use of robots, and in particular autonomous mobile robots (AMR), robot-to-robot interactions are becoming common place. Currently, most robot-to-robot interactions occur between robots that are within the same trust domain—that is, the individual robots are owned by, and/or operated on behalf of, a single enterprise, and generally operate in a common environment associated with the enterprise. Typically, these robot-to-robot interactions occur as each robot performs a sub-task that is part of a greater task. For example, in the context of manufacturing, a first robot may complete a task before handing off an article of manufacture to a second robot, so that the second robot can perform a subsequent task with the article. Similarly, when different robots are operating in a shared environment, such as a warehouse, the different robots may communicate with one another to expedite or convey closure of a particular task.

Generally, robots operating within a single trust domain do not require dynamic identification of peer robots. However, if multiple robots operating within a single trust domain do require robot identification, the robots tend be deployed with a common algorithm and protocols for recognizing and authenticating each other wirelessly. Moreover, as the robots are operating in the same trust domain, the robots may be under the supervision of a monitoring system or device, such as one or more cameras or a local server, to ensure adherence to local pre-established protocols.

As more service robots are deployed to perform a wider variety of tasks, there will be a significant increase in robot-to-robot interactions, where the individual robots that will be interacting with one another are owned by and operated on behalf of different entities, and thus, within different trust domains. By way of example, a fleet of delivery robots, robotaxis and/or autonomous vehicles may be owned by and in operation for the benefit of a first enterprise—a logistics and shipping company. Robots from this fleet may interact with a variety of other robots, operating in their own trust domain—for example, at a receiving warehouse or manufacturing site. Accordingly, in order for the robots to have trusted robot-to-robot interactions and exchanges of information and/or physical assets (e.g., packages, parcels and so forth) independently, without human supervision, the robots need to be able to identify and authenticate one another.

Consistent with embodiments described herein, a robot is provided with a software-based algorithm to process a variety of sensory inputs, for example, as obtained from various sensors integrated with the robot, in order to positively identify another robot. For example, consider a robot having a standard sensor suite consisting of all, or some subset, of the following sensors: LIDAR, camera, binocular or depth perceiving camera, audio sensor (e.g., a microphone), and Bluetooth® transceiver. Data obtained from the robot's standard sensor suite are processed and combined in a manner that allows one robot to uniquely identify or recognize another robot in a cooperative manner, without the need to engage or communicate with an authoritative third-party, such as a cloud or edge-based service, at the time of interaction between the robots. Whereas conventional authentication techniques tend to rely on a single item of information (e.g., a unique identifier, a password, or shared key), which tends to be easy to spoof, embodiments described herein advantageously combine multiple pseudo-unique characteristics to create an identity that is nearly impossible to spoof.

Consistent with some embodiments, input signals received by each of a plurality of different sensors of a robot are processed—in some instances, with pre-trained, machine learned algorithms (models)—to derive for each input signal a feature representative of the information processed by a specific sensor. Some of these features can then be compared with corresponding expected or known features. For example, an expected feature may be provided in advance of a robot-to-robot interaction, so at the time of the interaction, the feature derived from the obtained sensory input data can be compared with the known and validated feature. Certain expected features, such as those associated with physical or visual characteristics of a robot, can be calculated dynamically by using a previously received and stored image of a robot. Alternatively, with some embodiments, one or more expected features may be provided to a robot in advance of a robot-to-robot interaction, based on previously processed images of another robot. One or more of the input signals from the various sensors may be processed using a neural network classifier, such that the result of neural network classification is compared with stored values (e.g., an expected class) to determine the final results of the recognition process.

The use of LIDAR as well as monocular and binocular cameras is quite common in robotics. Accordingly, consistent with some embodiments, with these sensors, the dimensional features of a robot are determined (e.g., height, width, depth, shape, and color). In addition, color and thermal signature are obtained by using cameras that detect light above and below the visible spectrum. Additional characteristics like size of a screen (if present) and size of the AMR or wheel assembly are other factors used to identify a robot. These different attributes and characteristics together form a list of features to be compared. A relevant feature matching algorithm is applied to the various attributes and characteristics to compare these to the known features of the robot.

Any of a wide variety of wireless communications, including an audio signal, will have unique "signatures" that are specific to the hardware that produced the transmission, such as pitch and amplitude of an audio signal. Accordingly, consistent with some embodiments, sound from a speaker of a chatbot and/or transmissions from a Bluetooth® or Wi-Fi transmitter are monitored using signal processing techniques to derive an energy profile or "fingerprint" that is unique to a source robot. For instance, a first robot may utilize an audio signal sensor (e.g., microphone) and audio signal processor to obtain and process an audio signal generated by a second robot. This energy profile or "fingerprint" can be compared with expected values of the signal for purposes of determining whether a robot is exhibiting characteristics consistent with expected characteristics.

While there are no direct analogs to human smell in the robot domain, there are other derived characteristics that can be used as a substitute. For example, clock recovery mechanisms on the wireless transmissions of a robot can provide a hardware unique characteristic. The aspects of a query can also be examined; for example, the obvious response and the round-trip latency to get that response may not in itself be a unique identifier but certainly can be used as a classifier. Consistent with some embodiments, query-able items include one or more of the following robot specific details:

Physical characteristics of robot, like Make and model
Number and/or Types of Sensors
Manufacturer
Date since active/deployed
Owning entity identifier
Charging capability
Primary function
Package-ID (tracking number)
Current date and time
Date and time of expected robot-to-robot interaction The manner in which an approaching robot moves may be used as an additional classifier. LIDAR or cameras of a first robot monitor the smoothness of a second mobile robot's movement and provide the ability to calculate the average speed of the second robot. With some embodiments, a prearranged movement analogous to a "secret handshake" can provide more uniqueness to this classifier. By combining the various results of the individual processing functions that operate on different input signals, identification information for a robot is generated. Specifically, each of several different input sensors of a first robot are used to obtain input signals associated with different characteristics and/or behaviors of a second robot. The input signals are then processed, in some instances using pre-trained machine learning algorithms to generate identification information. In some instances, the identification information may be some value that can be compared with an expected or known value, while in other instances the identification information may be a particular class that is compared with a known or expected class. In any case, the identification information may be compared with known and trusted information, which may ultimately be weighted with a weighting factor, in order to make an assessment as to the authenticity of a robot. Other aspects and advantages of various embodiments of the subject matter described herein will be readily apparent from the description of the various figures that follows.

Figure 1:
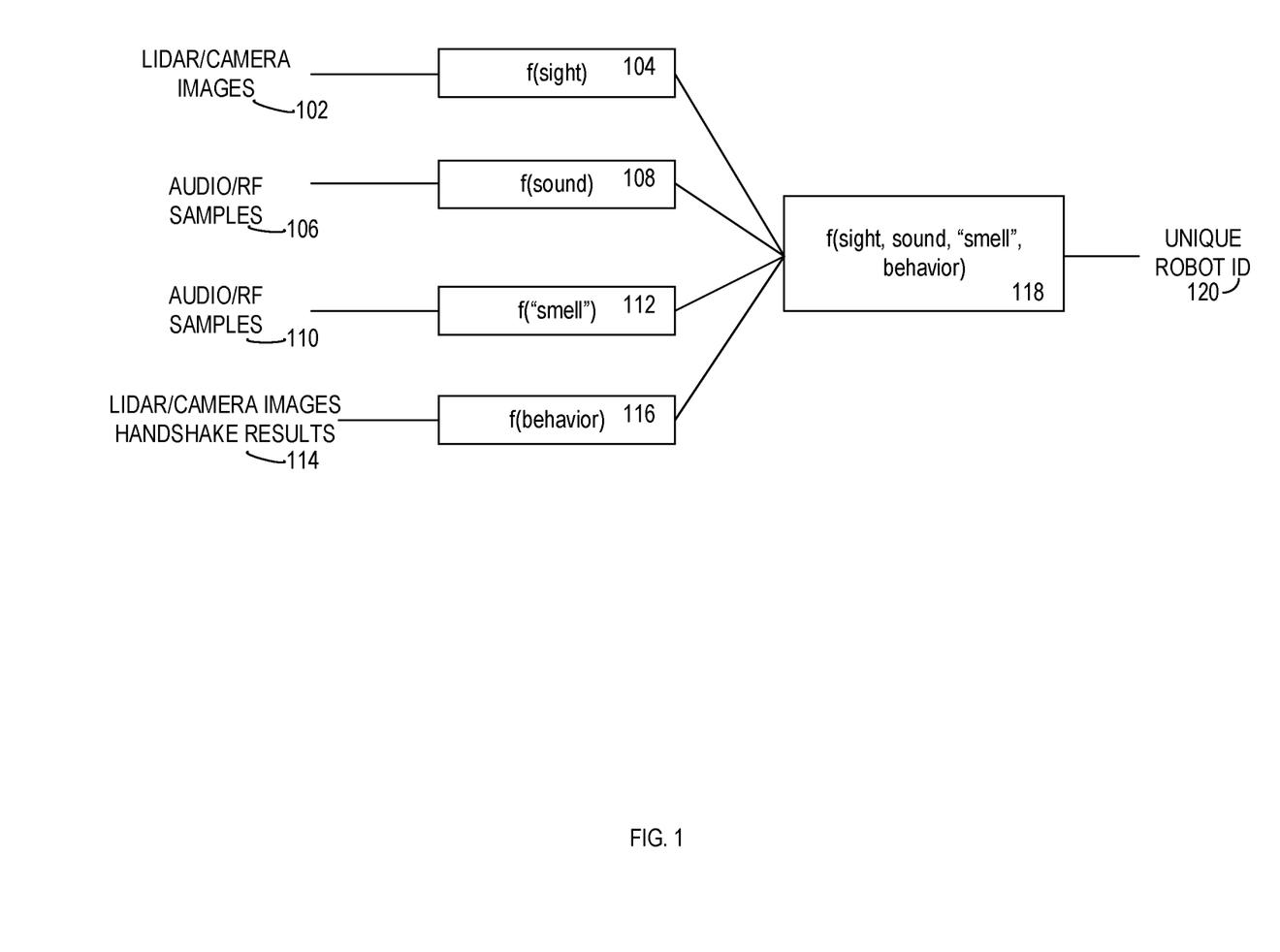
FIG. 1 is a diagram illustrating an example of an architecture or framework via which a first robot can process a variety of input signals to generate relevant identification information used to identify a second robot, consistent with some embodiments.

FIG. 1 is a diagram illustrating an example of an architecture or framework for a robot identification and authentication service via which a first robot can process a variety of input signals to generate identification information for use in identifying and authenticating a second robot, consistent with some embodiments. As illustrated in FIG. 1, four distinct input signals—each analogous to a human sensory input—are shown as being received and processed in accordance with four distinct processing functions. For instance, as shown with reference number 102, one or more images may be obtained from a LIDAR or camera of a robot, and then processed by a signal processing function (e.g., "f(sight)" with reference 104) to derive identification information. By way of example, an image of a second robot as received via an image sensor of a first robot may be processed by a pre-trained machine learned algorithm to generate from the image one or more values for certain characteristics of the second robot (e.g., height, width, depth, shape, and color).

A second sensor of a first robot—in this instance an audio sensor or radio frequency receiver, shown in FIG. 1 with reference number 106, receives an audio or RF signal as generated by the second robot. An audio processing function (e.g., "f(sound)" with reference 108) processes the signal to generate identification information associated with the second robot. A third sensor of the first robot receives yet another audio or radio frequency signal 110, and processes the signal with a signal processing function (e.g., "f('smell')" with reference number 112). Finally, a fourth sensor of the first robot receives information from a second robot, for example, as part of a handshake request. This signal 114 is processed with a signal processing function 116 to generate additional identification information.

As illustrated in FIG. 1, a separate consolidating function 118 is used to combine the various identification information derived by the individual signal processing functions to generate a final unique robot identification 120. The various signal processing functions (e.g., 104, 108, 112, and 116) may be implemented as either machine learned models, neural networks, more classical signal processing functions, or some combination thereof. With some embodiments, a threshold can be configured and implemented in the consolidating function 118 above such that some of the function results are weighted higher than others. By way of example, identification information as derived with the signal processing functions, f(sight)+f(sound)+f(behavior) may be weighted higher than that derived by the function, f(smell). A weight of zero may be provided to signify that a specific data point (e.g., function result) is optional when it comes to the main consolidating function 118. Consistent with some embodiments, the weighting factors may be dynamically determined based on such factors as, the time of day, environmental characteristics (e.g., whether it light, or dark, in the environment, and/or the level of ambient noise detected). The specific characteristics or features that need to be extracted are those discussed above. Different types of feature matching and classification algorithms can be used for each of the functions above to result in a unique identification (ID) 120 for a robot, as derived through the combination of the individual results of the functions. The unique ID 120 that is generated can then be compared with trusted information relating to the robot with which the interaction or exchange is to occur.

Figure 2:
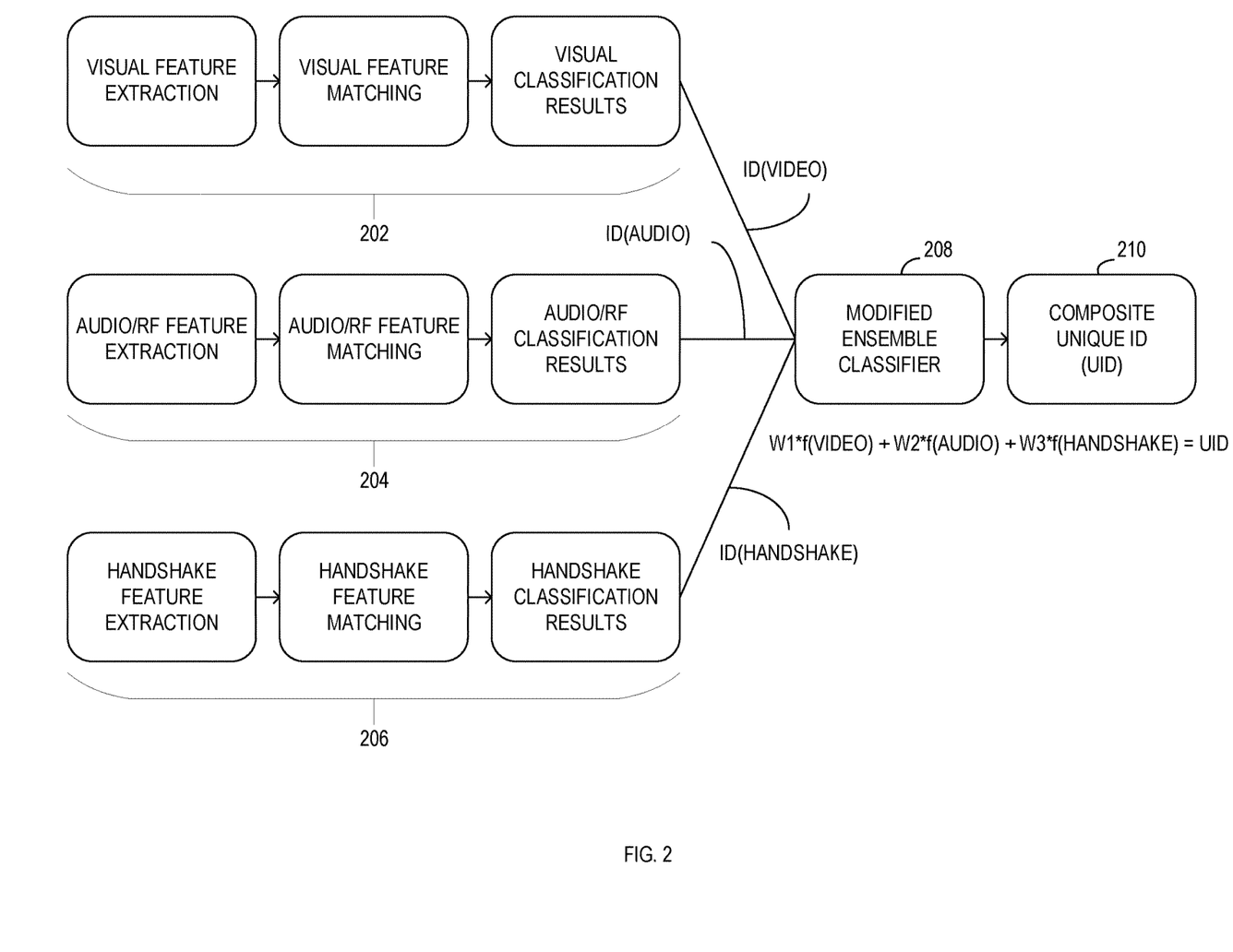
FIG. 2 is a diagram illustrating a specific framework for an ensemble learning technique by which a first robot may receive, classify, and combine various input signals in order to generate information used to identify a second robot, consistent with some embodiments.

FIG. 2 is a diagram illustrating a specific framework for an ensemble learning technique by which a first robot may receive, classify, and combine various input signals in order to generate information used to identify a second robot, consistent with some embodiments. In the example presented in FIG. 2, a modified ensemble classifier is used to determine the final classes related to each of the above categories. This is then utilized to create a composite unique ID based on the weights and individual classification functions applied to each category. The initial pre-trained machine learned models and/or functions may be uploaded to the robot periodically. Similarly, the results generated by a robot during an identification process may be communicated to a centralized service where the information is utilized as additional training data to improve the various models. As such, similar to human behavior, trust is built and improved over time. For example, consistent with some embodiments, each correct identification of a robot results in a reinforcement of the models. Incorrect identifications also result in reinforcement of the models, but in a way that ensures the incorrectly identified robot receives a different unique identity.

As illustrated in FIG. 2, the various components with reference number 202, receive visual information (e.g., one or more images) and extract one or more features from the image(s). The feature(s) extracted from the image(s) are then matched against known features to derive identification information in the form of a classification of the extracted feature(s). The various components with reference numbers 204 and 206 perform the same general type of processing, but on audio information (e.g., with reference 204) and handshake information (with reference 206). Accordingly, the result of the processing is a combination of identification information derived from different types of sensors and information (e.g., visual, audio, and handshake). As shown in FIG. 2, the component with reference 208 is a modified ensemble classifier that combines the various identification information to output a unique identifier 210 for the robot.

Figure 3:
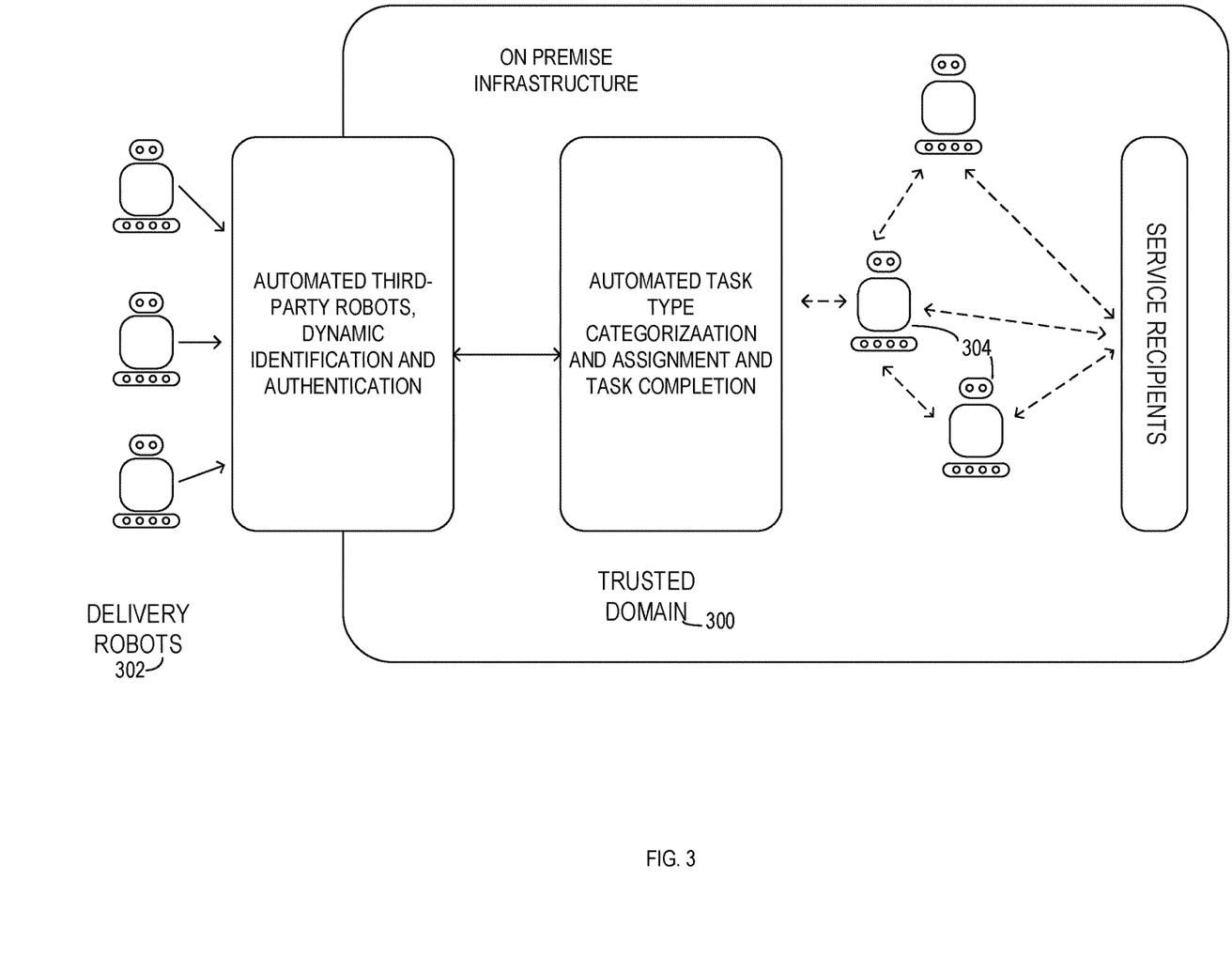
FIG. 3 is a diagram illustrating an example of a particular use case and environment in which a robot-to-robot recognition technique may occur, consistent with embodiments.

FIG. 3 is a diagram illustrating an example of a particular use case and environment in which a robot-to-robot recognition technique may occur, consistent with some embodiments. As shown in FIG. 3, a fleet of three delivery robots 302 are attempting to deliver an asset to a fleet of receiving robots 304 that are operating in a trusted domain 300. In this example, a robot receiving a package is referred to as a "receiving robot." In this example, the concept of a trusted domain is tied to a certain location, like a house or an office building, where the receiving robot is a member of the trusted domain at that location. A robot delivering a package is referred to herein as a "delivery robot," which could belong to a logistics or other delivery vendor responsible for delivering a package to the delivery area. As represented by the bounding boxes with reference numbers 306 and 308, before a delivery robot can exchange information and/interact with a receiving robot in the performance of a pre-programmed task 308, the receiving robot will authenticate 306 the delivery robot.

Figure 4:
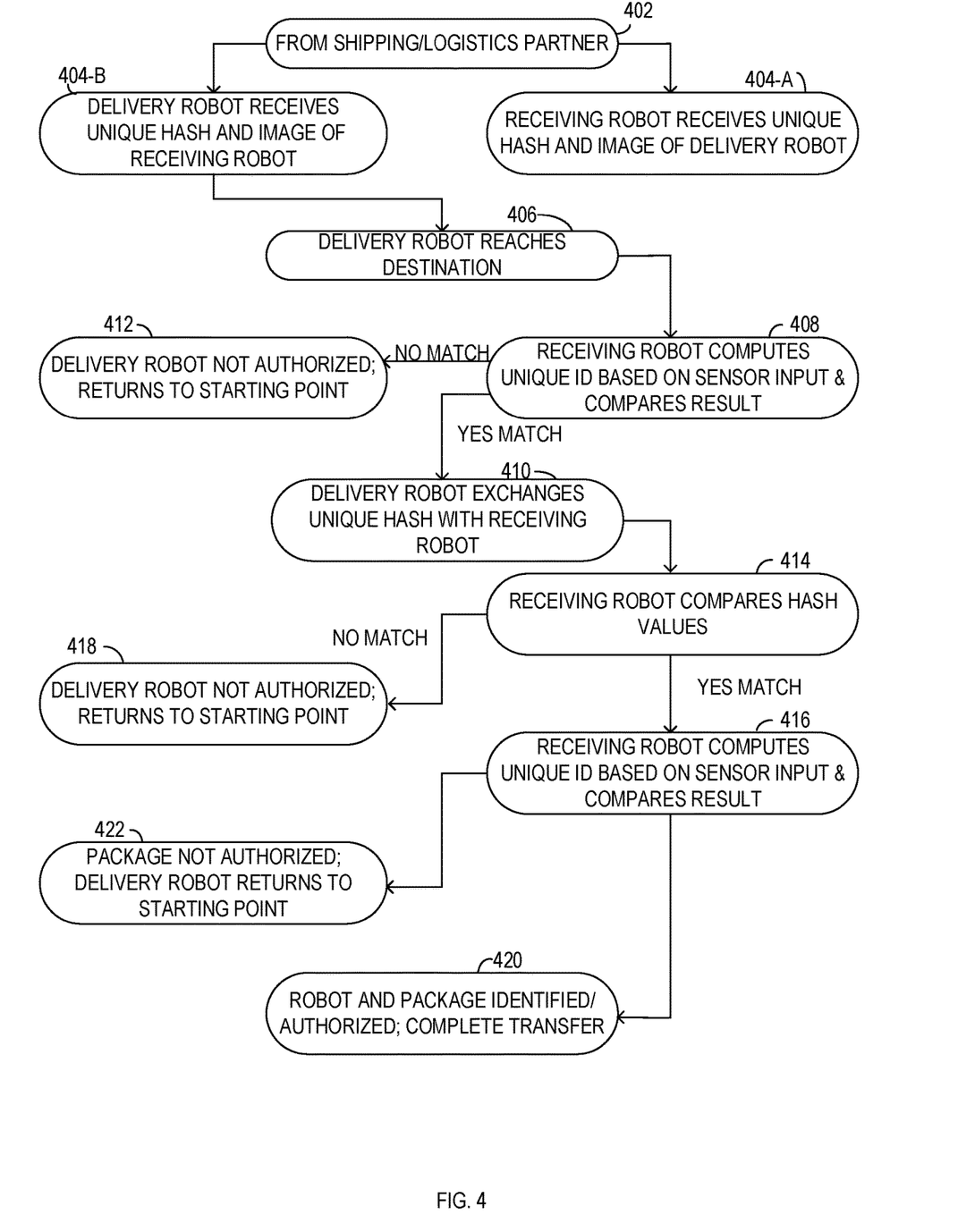
FIG. 4 is a flow diagram illustrating various operations that are performed during a robot-to-robot recognitions process, consistent with embodiments.

FIG. 4 is a flow diagram illustrating various operations that are performed during a robot-to-robot recognition process, as may occur in the environment illustrated in FIG. 3, consistent with some embodiments. As illustrated in FIG. 4, at operation 402, a software application executing on a server computer of a shipping and logistics enterprise generates a unique hash from various input information that is characteristic of a future (e.g., a planned) robot-to-robot interaction. By way of example, the hash function may be derived from input information that is descriptive of a robot-to-robot interaction—such as the delivery of some asset (e.g., one or more packages)—that is planned for some subsequent time. By way of example, the input to the hash generating function may include information that is both characteristics of a robot to which an asset is to be delivered, as well as characteristic of the asset to be delivered. For instance, the information may specify any one of the following:

Physical characteristics of robot, like Make and model
Number and/or Types of Sensors
Manufacturer
Date since active/deployed
Owning entity identifier
Charging capability
Primary function
Package-ID (tracking number)
Current date and time
Date and time of expected robot-to-robot interaction At operation 404-A, the unique hash is communicated from the server computer of the shipping and logistics enterprise to the receiving robot, along with information with which the receiving robot can confirm the identification of the delivery robot. For example, consistent with some embodiments, a photograph of the delivery robot is communicated to and received by the receiving robot. Consistent with some embodiments, in addition to or in place of an image, some pre-processed image information, such as one or more feature corresponding with features of the image, may be communicated to the robot. Simultaneously, at operation 404-B, the unique hash is communicated to and received by the delivery robot, along with a photograph, or other verification information, of the receiving robot. In some instances, additional information relating to the specific transaction may be communicated to one or the other of the delivery robot and/or the receiving robot. For example, in some instances, the day and time of the expected interaction between the robots may be communicated, as well as information indicating a location at which the interaction is to occur.

Next, as shown with reference number 406, the delivery robot arrives at the destination where the robot-to-robot interactions is scheduled to occur. At operation 408, the receiving robot obtains information from its suite of sensors—e.g., to include one or more photographs of the delivery robot, as captured with a camera of the receiving robot—and processes the sensor information to compute identification information for the delivery robot. This identification information is then compared with known, trusted information about the delivery robot, to include the photograph of the delivery robot as received at operation 404-A. If the receiving robot determines, at operation 408, that the identification information generated through the processing of its sensor inputs satisfactorily matches the known, trusted information that the receiving robot has access to relating to the delivery robot, then at operation 410, in response to being prompted, the delivery robot communicates the unique hash to the receiving robot. However, if at operation 408, the receiving robot does not identify the delivery robot—that is, if the comparison of identification information generated by the receiving robot does not sufficiently match the known, trusted identification information of the delivery robot—then at operation 412, the robot-to-robot interaction is terminated or rejected and the delivery robot returns to a starting point associated with its own domain.

At operation 414, after the delivery robot has communicated the unique hash to the receiving robot, the receiving robot compares the received hash with an instance of the hash stored in member at the receiving robot, as received during operation 404-A. If the two hash values are not a match, then at operation 418 the robot-to-robot interaction is terminated or rejected, and the delivery robot returns to a starting point associated with its own domain. However, if a determination is made that the two hash values are in fact a match, then at operation 416, the receiving robot obtains additional sensor input, including one or more photographs of the asset (e.g., parcel) that is to be delivered, and generates identification information concerning the asset, which is ultimately compared with known, trusted information received earlier at operation 404-A—including the previously received photograph of the parcel.

If the identification information of the parcel or package, as generated through the identification process using sensor information at the receiving robot, does not match the known, trusted information, then the parcel is deemed to be invalid or not authorized, and the interaction is terminated. The delivery robot will then return to a starting point associated with its trusted domain. However, if the comparison of the identification information generated for the package by the receiving robot matches the known, trusted information for the package, then at operation 420, the delivery robot is authorized to deliver the package and the interaction is concluded successfully with delivery of the parcel.

While FIG. 4 illustrates an example of a receiving robot identifying and authenticating a delivery robot, one skilled in the art will readily appreciate that a delivery robot may be configured to identify and authenticate a receiving robot in much the same way. Consistent with some embodiments, a delivery robot may benefit from receiving additional information, for example, at method operation 404-B for use in performing the identification and authentication procedure. Specifically, the delivery robot may receive as part of the logistical information (e.g., instructions relating to the delivery task) some specific information concerning the location at which the robot-to-robot interaction is to occur. This information may be included as part of the hash, or may be provided separately. In any case, the location information received by the delivery robot can be utilized as part of the identification and authentication process. For example, when the delivery robot is attempting to identify the receiving robot, the delivery robot may compare its actual location, for example, as obtained from a location sensor (e.g., GPS, or other sensor) with the location information received as part of the logistical programming. When the location information is a match, this may positively contribute to the identification and authentication process. Furthermore, consistent with some embodiments, the weighting factor that is applied to the result of the location comparison may be dependent upon the nature of the location. By way of example, if a delivery robot is performing a robot-to-robot interaction at a location that is known to be a trusted domain of the receiving robot (e.g., at a home, warehouse, facility, etc.), the weighting factor applied to the result of the location comparison may be greater than in those instances where the location is a public location, or a location that is not specifically known as a trusted domain of the receiving robot.

While many of the examples presented herein are described as being performed by robots, or automated mobile robots, one skilled in the art will readily recognize that the same methods and operations may be performed by robotic vehicles, robotaxis, and/or automatous or self-driving vehicles, including those used for the transport of humans or goods. Furthermore, while many of the examples presented herein describe the specific use case of a robot interacting with another robot by delivering a package or parcel, one skilled in the art will readily appreciate that this is simply one example of an interaction that may occur between two robots. In other instance, a robot-to-robot interaction may involve the transfer of digital information, as opposed to a physical parcel or package. Similarly, in other examples, a first robot may identify and authenticate a second robot, prior to the first robot physically interacting with the second robot for the purpose of performing a maintenance or diagnostic operation on the second robot. In some instances, the interaction may be related to monitoring, such that the authentication of a robot by another robot is the primary task. In yet other instances, the robot-to-robot interactions may involve other purposes.

Figure 5:
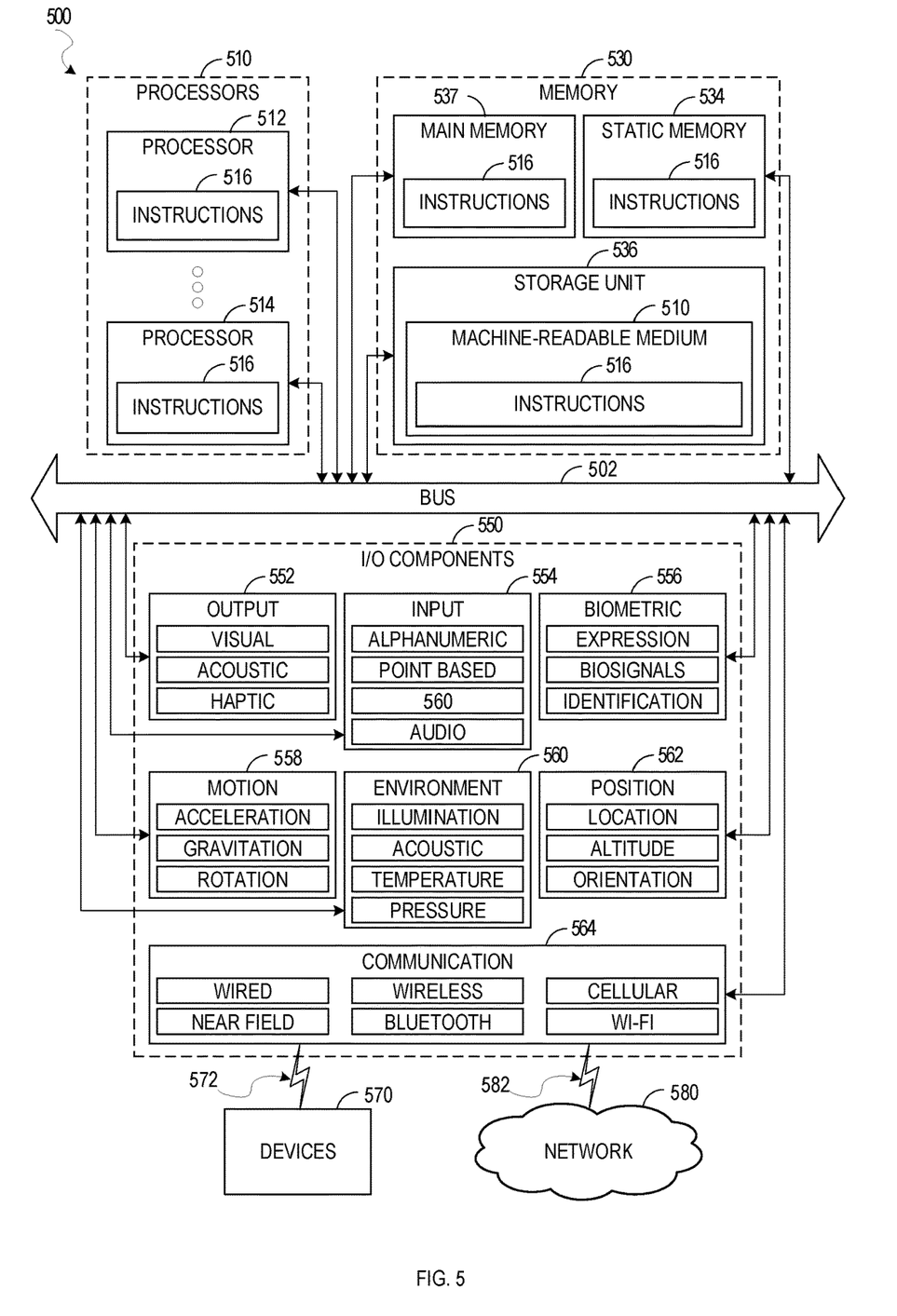
FIG. 5 illustrates a diagrammatic representation of a machine in the form of a computer system within which a set of instructions may be executed for causing the machine to perform any one or more of the methodologies discussed herein, according to an example embodiment.

FIG. 5 illustrates a diagrammatic representation of a machine 500 in the form of a computer system within which a set of instructions may be executed for causing the machine to perform any one or more of the methodologies discussed herein, according to an example embodiment. Specifically, FIG. 5 shows a diagrammatic representation of the machine 500 in the example form of a computer system, within which instructions 516 (e.g., software, a program, an application, an applet, an app, or other executable code) for causing the machine 500 to perform any one or more of the methodologies discussed herein may be executed. For example the instructions 516 may cause the machine 500 to execute any one of the method operations described in connection with FIG. 4. Additionally, or alternatively, the instructions 516 may implement the devices and/or systems described in connection with FIGS. 1, 2 and 3, and so forth. The instructions 516 transform the general, non-programmed machine 500 into a particular machine 500 programmed to carry out the described and illustrated functions in the manner described. In alternative embodiments, the machine 500 operates as a standalone device or may be coupled (e.g., networked) to other machines. In a networked deployment, the machine 500 may operate in the capacity of a server machine or a client machine in a server-client network environment, or as a peer machine in a peer-to-peer (or distributed) network environment. The machine 500 may comprise, but not be limited to, a server computer, a client computer, a PC, a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 516, sequentially or otherwise, that specify actions to be taken by the machine 500. Further, while only a single machine 500 is illustrated, the term "machine" shall also be taken to include a collection of machines 500 that individually or jointly execute the instructions 516 to perform any one or more of the methodologies discussed herein.

The machine 500 may include processors 510, memory 530, and I/O components 550, which may be configured to communicate with each other such as via a bus 502. In an example embodiment, the processors 510 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 512 and a processor 514 that may execute the instructions 516. The term "processor" is intended to include multi-core processors that may comprise two or more independent processors (sometimes referred to as "cores") that may execute instructions contemporaneously. Although FIG. 5 shows multiple processors 510, the machine 500 may include a single processor with a single core, a single processor with multiple cores (e.g., a multi-core processor), multiple processors with a single core, multiple processors with multiples cores, or any combination thereof.

The memory 530 may include a main memory 532, a static memory 534, and a storage unit 536, all accessible to the processors 510 such as via the bus 502. The main memory 530, the static memory 534, and storage unit 536 store the instructions 516 embodying any one or more of the methodologies or functions described herein. The instructions 516 may also reside, completely or partially, within the main memory 532, within the static memory 534, within the storage unit 536, within at least one of the processors 510 (e.g., within the processor's cache memory), or any suitable combination thereof, during execution thereof by the machine 500.

The I/O components 550 may include a wide variety of components to receive input, provide output, produce output, transmit information, exchange information, capture measurements, and so on. The specific I/O components 550 that are included in a particular machine will depend on the type of machine. For example, portable machines such as mobile phones will likely include a touch input device or other such input mechanisms, while a headless server machine will likely not include such a touch input device. It will be appreciated that the I/O components 550 may include many other components that are not shown in FIG. 5. The I/O components 550 are grouped according to functionality merely for simplifying the following discussion and the grouping is in no way limiting. In various example embodiments, the I/O components 550 may include output components 552 and input components 554. The output components 552 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 554 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 550 may include biometric components 556, motion components 558, environmental components 560, or position components 562, among a wide array of other components. For example, the biometric components 556 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 558 may include acceleration sensor components (e.g., accelerometer), gravitation sensor components, rotation sensor components (e.g., gyroscope), and so forth. The environmental components 560 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 562 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 950 may include communication components 564 operable to couple the machine 500 to a network 580 or devices 570 via a coupling 582 and a coupling 572, respectively. For example, the communication components 564 may include a network interface component or another suitable device to interface with the network 580. In further examples, the communication components 564 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 570 may be another machine or any of a wide variety of peripheral devices (e.g., a peripheral device coupled via a USB).

Moreover, the communication components 564 may detect identifiers or include components operable to detect identifiers. For example, the communication components 564 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 564, such as location via Internet Protocol (IP) geolocation, location via Wi-Fi® signal triangulation, location via detecting an NFC beacon signal that may indicate a particular location, and so forth.

The various memories (i.e., 530, 532, 534, and/or memory of the processor(s) 510) and/or storage unit 536 may store one or more sets of instructions and data structures (e.g., software) embodying or utilized by any one or more of the methodologies or functions described herein. These instructions (e.g., the instructions 516), when executed by processor(s) 510, cause various operations to implement the disclosed embodiments.

As used herein, the terms "machine-storage medium," "device-storage medium," "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 580 may be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a Wi-Fi® network, another type of network, or a combination of two or more such networks. For example, the network 580 or a portion of the network 580 may include a wireless or cellular network, and the coupling 582 may be a Code Division Multiple Access (CDMA) connection, a Global System for Mobile communications (GSM) connection, or another type of cellular or wireless coupling. In this example, the coupling 582 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 516 may be transmitted or received over the network 580 using a transmission medium via a network interface device (e.g., a network interface component included in the communication components 564) and utilizing any one of a number of well-known transfer protocols (e.g., HTTP). Similarly, the instructions 516 may be transmitted or received using a transmission medium via the coupling 572 (e.g., a peer-to-peer coupling) to the devices 570. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 516 for execution by the machine 500, and includes digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a matter as to encode information in the signal.

The terms "machine-readable medium," "computer-readable medium" and "device-readable medium" mean the same thing and may be used interchangeably in this disclosure. The terms are defined to include both machine-storage media and transmission media. Thus, the terms include both storage devices/media and carrier waves/modulated data signals.

In one example embodiment, a method and apparatus are provided to enable a first mobile robot to identify and/or authenticate a second mobile robot. As part of the method, the first mobile robot receives information over a communications network from a trusted device, wherein the trusted identification information is for use in authenticating the second mobile robot. The trusted identification information includes at least an image of the second automated mobile robot. Subsequent to receiving the one or more images of the second automated mobile robot and responsive to determining that the second automated mobile robot is in close proximity, the first mobile robot obtains a plurality of input signals from a plurality of integral sensors, and for each input signal of the plurality of input signals, processes the input signal with a pre-trained machine learned model to derive identification information for use in authentication the second automated mobile robot. The derived information is then compared with the trusted identification information to determine that the derived identification information satisfies an authentication requirement. When the first automated mobile robot determines that the derived identification information satisfies an authentication requirement, the first robot communicates a message to the second mobile robot to indicate successful authentication of the second automated mobile robot, by the first automated mobile robot.

In another example embodiment, the authentication procedure performed by the first automated mobile robot involves receiving from the computing device an image of the second automated mobile robot. At least one signal of the plurality of signals received by the first automated mobile robot is an image of the second automated mobile robot, obtained via an image sensor of the first automated mobile robot. The first automated mobile robot processes each image, with a pre-trained machine learned model to derive from each image a feature associated with visual characteristic of the second automated mobile robot. These features are then compared to derive some unique identifying information for the second mobile robot, which is used to generate a unique identifier for the second automated mobile robot.

In another example embodiment, the authentication procedure performed by the first automated mobile robot involves receiving from the computing device a first feature associated with a visual characteristic of the second automated mobile robot. This first feature may be derived by the computing device, using a machine learned model. Then, at least one signal of the plurality of signals received by the first automated mobile robot is an image of the second automated mobile robot, obtained via an image sensor of the first automated mobile robot. The first automated mobile robot processes the image as obtained with its image sensor, with a pre-trained machine learned model, to derive from the image a second feature associated with the same visual characteristic of the second automated mobile robot. The first and second features are then compared to derive some unique identifying information for the second mobile robot, which is used to generate a unique identifier for the second automated mobile robot.

In another example embodiment, the identification and authentication process involves the first mobile automated mobile robot receiving from the computing device a first feature representing an audio characteristic of an audio signal generated by the second automated mobile robot. The first automated mobile robot additionally receives an input signal that is an audio signal generated by the second automated mobile robot, as obtained by an audio sensor of the first automated mobile robot. The obtained signal is processed to generate a second feature representing the audio characteristic of the audio signal generated by the second automated mobile robot. Finally, the first and second features, both representing the audio characteristic of the second automated mobile robot, are compared to derive some identification information that is ultimately used to derive a unique identifier for the second automated mobile robot.

In another example embodiment, the identification and authentication process involves the first mobile automated mobile robot receiving from the computing device a first feature representing a handshake characteristic of the second automated mobile robot. The first automated mobile robot additionally receives data during a handshake operation with the second automated mobile robot. The obtained data is processed to generate a second feature representing the handshake characteristic of the second automated mobile robot. Finally, the first and second features, both representing the handshake characteristic of the second automated mobile robot, are compared to derive some identification information that is ultimately used to derive a unique identifier for the second automated mobile robot.

In another example embodiment, the identification and authentication process involves the first automated mobile robot receiving from the computing device a first instance of a hash, as generated by the computing device. Additionally, the first automated mobile robot requests the second automated mobile robot to provide a second instance of the hash, via a wireless communication between the robots. The second instance of the hash, as received from the second automated mobile robot, is then compared with the first instance of the hash, as received with trusted identification information from the computing device. The result of the comparison is then used in deriving identification information for the second automated mobile robot.

In another example embodiment, a first automated mobile robot receives from a computing device trusted identification information that includes an image of a package or parcel to be delivered to the first automated mobile robot by a second automated mobile robot. Then, during a robot-to-robot interaction between the first and second robots, the first automated mobile robot receives an image from an image sensor of the first robot. The images are processed to derive for each image a feature associated with a visual characteristic of the package or parcel. The features are then compared, and the result is used to derive identification information for the package, and ultimately used to authenticate the delivery task.

In another example embodiment, a first automated mobile robot receives location information from a computing device associated with a shipping and logistics entity, where the location information indicates a location at which a robot-to-robot interaction is to occur, and specifically, a location at which the first automated mobile robot is to deliver a package or parcel to a second automated mobile robot. Then, at some subsequent time, the first automated mobile robot determines its location with information obtained by a location sensor (e.g., GPS component) of the first automated mobile robot. The location information obtained by the location sensor is then compared with the previously received location information, as received from the computing device. The result of the comparison is used as part of an authentication process, by which the first automated mobile robot determines the authenticity of a second mobile robot, to which the first mobile robot is to deliver a package or parcel.

Another example embodiment involves at least one machine-readable medium having instructions stored thereon, which, when executed by processing circuitry, cause the processing circuitry to perform operations to implement any of the preceding examples.

Another example embodiment is an apparatus including means to implement any of the preceding examples.

Another example embodiment is a system to implement any of the preceding examples.

Another example embodiment is a method to implement any of the preceding examples.

What is claimed is:

1. A non-transitory computer-readable storage medium having instructions stored thereon, which, when executed by a processor of a first automated mobile robot, cause the first automated mobile robot to perform operations comprising:

receiving over a wireless communications network, from a computing device, trusted identification information for use in authenticating a second automated mobile robot, wherein the trusted identification information includes location information identifying a location at which the first automated mobile robot is to interact with the second automated mobile robot; and     subsequent to receiving the trusted identification information and responsive to determining that the first automated mobile robot is in the location at which the first automated mobile robot is to interact with the second automated mobile robot:

obtaining a plurality of input signals from a plurality of sensors;

for each input signal of the plurality of input signals, processing the input signal with a pre-trained machine learned model to derive identification information for use in authenticating the second automated mobile robot, wherein at least one input signal of the plurality of input signals is a signal indicating a location of the first automated mobile robot as obtained from a location sensor of the first automated mobile robot, and wherein the location information received from the computing device is compared with the location information obtained from the location sensor of the first automated mobile robot to generate the derived identification information;

combining the derived identification information associated with each input signal to derive a unique identifier for the second automated mobile robot;

comparing the unique identifier with the trusted identification information to determine that the unique identifier satisfies an authentication requirement; and responsive to determining that the unique identifier satisfies an authentication requirement, communicating a message to the second automated mobile robot to indicate successful authentication of the second automated mobile robot, by the first automated mobile robot.

2. The non-transitory computer-readable storage medium of claim 1, wherein the trusted identification information received from the computing device includes an image of the second automated mobile robot, and at least one input signal of the plurality of input signals is an image of the second automated mobile robot as obtained from an image sensor of the first automated mobile robot, the operations further comprising:

processing the image of the second automated mobile robot received from the computing device with a pre-trained machine learned model to generate a first feature associated with a visual characteristic of the second automated mobile robot;

processing the image of the second automated mobile robot obtained from the image sensor of the first automated mobile robot with the pre-trained machine learned model to generate a second feature associated with the visual characteristic of the second automated mobile robot; and comparing the first feature with the second feature to generate derived identification information that is used to derive the unique identifier for the second automated mobile robot.

3. The non-transitory computer-readable storage medium of claim 1, wherein the trusted identification information received from the computing device includes a first feature representing a visual characteristic of the second automated mobile robot, and at least one input signal of the plurality of input signals is an image of the second automated mobile robot as obtained from an image sensor of the first automated mobile robot, the operations further comprising:

processing the image of the second automated mobile robot obtained from the image sensor of the first automated mobile robot with a pre-trained machine learned model to generate a second feature associated with the visual characteristic of the second automated mobile robot; and comparing the first feature with the second feature to generate derived identification information that is used to derive the unique identifier for the second automated mobile robot.

4. The non-transitory computer-readable storage medium of claim 1, wherein the trusted identification information received from the computing device includes a first feature representing an audio characteristic of an audio signal generated by the second automated mobile robot, and at least one input signal of the plurality of input signals is an audio signal generated by the second automated mobile robot as obtained by an audio sensor of the first automated mobile robot, the operations further comprising:

processing the audio signal of the second automated mobile robot obtained from the audio sensor of the first automated mobile robot to generate a second feature representing the audio characteristic of the audio signal generated by the second automated mobile robot; and comparing the first feature with the second feature to generate derived identification information that is used to derive the unique identifier for the second automated mobile robot.

5. The non-transitory computer-readable storage medium of claim 1, wherein the trusted identification information received from the computing device includes a first feature representing a handshake characteristic of the second automated mobile robot, and at least one input signal of the plurality of input signals is data obtained during a handshake operation, via a radio frequency transceiver, with the second automated mobile robot by the first automated mobile robot, the operations further comprising:

processing the data obtained during the handshake operation obtained via the radio frequency transceiver of the first automated mobile robot to generate a second feature associated with the handshake characteristic of the second automated mobile robot; and comparing the first feature with the second feature to generate derived identification information that is used to derive the unique identifier for the second automated mobile robot.

6. The non-transitory computer-readable storage medium of claim 1, wherein the trusted identification information received from the computing device includes a first instance of a hash, the operations further comprising:

receiving a wireless communication from the second automated mobile robot, the wireless communication including a second instance of a hash;

processing the second instance of the hash to determine that the second instance of the hash matches the first instance of the hash, as received from the computing device; and responsive to determining that the second instance of the hash matches the first instance of the hash, communicating a message to the second automated mobile robot to indicate successful authentication of the hash.

7. The non-transitory computer-readable storage medium of claim 6, wherein the trusted identification information received from the computing device includes an image of a package to be exchanged between the second automated mobile robot and the first automated mobile robot, the operations further comprising:

subsequent to determining that the second instance of the hash matches the first instance of the hash, obtaining an image of the package via an image sensor of the first automated mobile robot;

processing the image of the package received from the computing device with a pre-trained machine learned model to generate a first feature associated with a visual characteristic of the package;

processing the image of the package obtained from the image sensor of the first automated mobile robot with the pre-trained machine learned model to generate a second feature associated with the visual characteristic of the package; and comparing the first feature with the second feature to determine whether the package satisfies an authentication requirement.

8. An automated mobile robot comprising:
a plurality of sensors;
at least one processor; and
a memory storage device storing instructions thereon, which, when executed by the at least one processor, cause the automated mobile robot to perform operations comprising:
  receiving over a wireless communications network, from a trusted computing device, trusted identification information for use in authenticating a second automated mobile robot, wherein the trusted identification information includes location information identifying a location at which the automated mobile robot is to interact with the second automated mobile robot; and
  subsequent to receiving the trusted identification information and responsive to determining that the automated mobile robot is in the location at which the automated mobile robot is to interact with the second automated mobile robot:
    obtaining a plurality of input signals from the plurality of sensors;
    for each input signal of the plurality of input signals, processing the input signal with a pre-trained machine learned model to derive identification information for use in authenticating the second automated mobile robot, wherein at least one input signal of the plurality of input signals is a signal indicating a location of the automated mobile robot as obtained from a location sensor of the automated mobile robot, and wherein the location information received from the computing device is compared with the location information obtained from the location sensor of the automated mobile robot to generate the derived identification information;
    combining the derived identification information associated with each input signal to derive a unique identifier for the second automated mobile robot;
    comparing the unique identifier with the trusted identification information to determine that the unique identifier satisfies an authentication requirement; and
    responsive to determining that the unique identifier satisfies an authentication requirement, communicating a message to the second automated mobile robot to indicate successful authentication of the second automated mobile robot, by the automated mobile robot.

9. The automated mobile robot of claim 8, wherein the trusted identification information received from the trusted computing device includes an image of the second automated mobile robot, and at least one input signal of the plurality of input signals is an image of the second automated mobile robot as obtained from an image sensor of the automated mobile robot, the operations further comprising:
  processing the image of the second automated mobile robot received from the trusted computing device with the pre-trained machine learned model to generate at a first feature associated with a visual characteristic of the second automated mobile robot;
  processing the image of the second automated mobile robot obtained from the image sensor of the automated mobile robot with the pre-trained machine learned model to generate a second feature associated with the visual characteristic of the second automated mobile robot; and
  comparing the first feature with the second feature to generate derived identification information that is used to derive the unique identifier for the second automated mobile robot.

10. The automated mobile robot of claim 8, wherein the trusted identification information received from the trusted computing device includes a first feature representing a visual characteristic of the second automated mobile robot, and at least one input signal of the plurality of input signals is an image of the second automated mobile robot as obtained from an image sensor of the automated mobile robot, the operations further comprising:
  processing the image of the second automated mobile robot obtained from the image sensor of the automated mobile robot with a pre-trained machine learned model to generate a second feature associated with the visual characteristic of the second automated mobile robot; and
  comparing the first feature with the second feature to generate derived identification information that is used to derive the unique identifier for the second automated mobile robot.

11. The automated mobile robot of claim 8, wherein the trusted identification information received from the trusted computing device includes a first feature representing an audio characteristic of an audio signal generated by the second automated mobile robot, and at least one input signal of the plurality of input signals is an audio signal generated by the second automated mobile robot as obtained by an audio sensor of the automated mobile robot, the operations further comprising:
  processing the audio signal of the second automated mobile robot obtained from the audio sensor of the automated mobile robot to generate a second feature associated with the audio characteristic of the audio signal generated by the second automated mobile robot; and
  comparing the first feature with the second feature to generate derived identification information that is used to derive the unique identifier for the second automated mobile robot.

12. The automated mobile robot of claim 8, wherein the trusted identification information received from the trusted computing device includes a first feature representing a handshake characteristic of the second automated mobile robot, and at least one input signal of the plurality of input signals is data obtained during a handshake operation, via a radio frequency transceiver, with the second automated mobile robot by the automated mobile robot, the operations further comprising:
  processing the data obtained during the handshake operation obtained via the radio frequency transceiver of the automated mobile robot to generate a second feature associated with the handshake characteristic of the second automated mobile robot; and
  comparing the first feature with the second feature to generate derived identification information that is used to derive the unique identifier for the second automated mobile robot.

13. The automated mobile robot of claim 8, wherein the trusted identification information received from the trusted computing device includes a first instance of a hash, the operations further comprising:

receiving a wireless communication from the second automated mobile robot, the wireless communication including a second instance of a hash;

processing the second instance of the hash to determine that the second instance of the hash match the first instance of the hash, as received from the trusted computing device; and responsive to determining that the second instance of the hash matches the first instance of the hash, communicating a message to the second automated mobile robot to indicate successful authentication of the hash.

14. The automated mobile robot of claim 13, wherein the trusted identification information received from the trusted computing device includes an image of a package to be exchanged between the second automated mobile robot and the automated mobile robot, the operations further comprising:

subsequent to determining that the second instance of the hash matches the first instance of the hash, obtaining an image of the package via an image sensor of the automated mobile robot;

processing the image of the package received from the trusted computing device with a pre-trained machine learned model to generate a first feature associated with a visual characteristic of the package;

processing the image of the package obtained from the image sensor of the automated mobile robot with the pre-trained machine learned model to generate a second feature associated with the visual characteristic of the package; and comparing the first feature with the second feature to determine whether the package satisfies an authentication requirement.

15. An apparatus comprising:

means for receiving over a wireless communications network, from a computing device, trusted identification information for use in authenticating a robot, wherein the trusted identification information received from the computing device includes location information identifying a location at which the apparatus is to interact with the robot;

means for obtaining a plurality of input signals from a plurality of sensors, subsequent to receiving the trusted identification information;

means for processing each input signal in the plurality of input signals to derive identification information for use in authenticating the robot, wherein at least one input signal of the plurality of input signals is a signal indicating a location of the apparatus as obtained from a location sensor of the apparatus;

means for comparing the location information received from the computing device with the location information obtained from the location sensor of the apparatus to generate the derived identification information that is used to derive a unique identifier for the robot;

means for combining the derived identification information associated with each input signal to derive the unique identifier for the robot;

means for comparing the unique identifier with the trusted identification information to determine that the unique identifier satisfies an authentication requirement; and means for communicating a message to the robot to indicate successful authentication of the robot, responsive to determining that the unique identifier satisfies an authentication requirement.

16. The apparatus of claim 15, wherein the trusted identification information received from the computing device includes an image of the robot, and at least one input signal of the plurality of input signals is an image of the robot as obtained from an image sensor of the apparatus, the apparatus further comprising:

means for processing the image of the robot received from the computing device to generate a first feature associated with a visual characteristic of the robot;

means for processing the image of the robot obtained from the image sensor of the apparatus to generate a second feature associated with the visual characteristic of the robot; and means for comparing the first feature with the second feature to generate derived identification information that is used to derive the unique identifier for the robot.

17. The apparatus of claim 15, wherein the trusted identification information received from the computing device includes a first feature representing a visual characteristic of the robot, and at least one input signal of the plurality of input signals is an image of the robot as obtained from an image sensor of the apparatus, the apparatus further comprising:

means for processing the image of the robot obtained from the image sensor of the apparatus to generate a second feature associated with the visual characteristic of the robot; and means for comparing the first feature with the second feature to generate derived identification information that is used to derive the unique identifier for the robot.

18. The apparatus of claim 15, wherein the trusted identification information received from the computing device includes a first feature representing an audio characteristic of an audio signal generated by the robot, and at least one input signal of the plurality of input signals is an audio signal generated by the robot as obtained by an audio sensor of the apparatus, the apparatus further comprising:

means for processing the audio signal generated by the robot obtained from the audio sensor of the apparatus to generate a second feature associated with the audio characteristic of the audio signal as generated by the robot; and means for comparing the first feature with the second feature to generate derived identification information that is used to derive the unique identifier for the robot.

19. The apparatus of claim 15, wherein the trusted identification information received from the computing device includes a first feature representing a handshake characteristic of a wireless communication with the robot, and at least one input signal of the plurality of input signals is data obtained during a handshake operation, via a radio frequency transceiver, with the robot by the apparatus, the apparatus further comprising:

means for processing the data obtained during the handshake operation obtained via the radio frequency transceiver of the apparatus to generate a second feature associated with the handshake characteristic of the robot; and means for comparing the first feature with the second feature to generate derived identification information that is used to derive the unique identifier for the robot.

20. The apparatus of claim 15, wherein the trusted identification information received from the computing device includes a first instance of a hash, the apparatus further comprising:

means for receiving a wireless communication from the robot, the wireless communication including a second instance of a hash;

means for processing the second instance of the hash to determine that the second instance of the hash matches the first instance of the hash, as received from the computing device; and means for communicating a message to the robot to indicate successful authentication of the hash, responsive to determining that the second instance of the hash matches the first instance of the hash.

21. The apparatus of claim 20, wherein the trusted identification information received from the computing device includes an image of a package to be exchanged between the robot and the apparatus, the apparatus further comprising:

means for obtaining an image of the package via an image sensor of the apparatus, subsequent to determining that the second instance of the hash matches the first instance of the hash;

means for processing the image of the package received from the computing device to generate a first feature associated with a visual characteristic of the package;

means for processing the image of the package to generate a second feature associated with the visual characteristic of the package; and means for comparing the first feature with the second feature to determine whether the package satisfies an authentication requirement.

* * * * *